United States Patent
Taniguchi et al.

(10) Patent No.: US 6,271,611 B1
(45) Date of Patent: *Aug. 7, 2001

(54) AXIAL FLOW FAN MOTOR

(75) Inventors: Noboru Taniguchi; Mitsuo Konno, both of Miyota-machi (JP)

(73) Assignee: Minebea Co., Ltd., Nagano-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/292,940

(22) Filed: Apr. 16, 1999

(30) Foreign Application Priority Data

Jan. 11, 1999 (JP) .................................................. 11-003986

(51) Int. Cl.$^7$ ...................................................... H02K 5/16
(52) U.S. Cl. .................................. 310/89; 310/90; 310/91
(58) Field of Search .............................. 310/90, 89, 67 R, 310/91

(56) References Cited

U.S. PATENT DOCUMENTS

| | | | |
|---|---|---|---|
| 4,682,065 | * 7/1987 | English et al. | 310/90 |
| 4,825,114 | * 4/1989 | Ohtsuka et al. | 310/90 |
| 5,245,238 | * 9/1993 | Horng | 310/67 R |
| 5,650,678 | * 7/1997 | Yokozawa et al. | 310/90 |
| 6,023,117 | * 2/2000 | Chen | 310/91 |
| 6,121,710 | * 9/2000 | Ho | 310/254 |

* cited by examiner

*Primary Examiner*—Burton S. Mullins
(74) *Attorney, Agent, or Firm*—Oliff & Berridge, PLC

(57) ABSTRACT

The motor housing 27 and the bearing box 19 are formed separately, the motor housing 27 is provided with the central projection 2 for coupling the bearing box 19 with the motor housing 27 and the removal preventing stepped portions 20, 28 are provided on the bearing box 19 and the central projection 2. Thereby, without using any glue, the bearing box 19 is fixed and the assembly workability and productivity are increased. Further, by forming the bearing box 19 with the resin having a heat resistance, the use amount of the high priced resin of the separated bearing box 19 is lessened to make the cost thereof lowered and the heat deformation and deterioration small for maintaining the function of the axial flow fan motor and prolonging the life thereof.

14 Claims, 7 Drawing Sheets

AXIAL FLOW FAN MOTOR

BACKGROUND OF THE INVENTION

1. Field of the Invention

The present invention relates to an improvement of an axial flow fan motor for use of OA (office automation) appliance.

2. Conventional Art

Since most OA appliances comprise various electronic circuits within their housings. And, every electronic part consisting of those circuits generates heat. And, due to this heat generation, electronic parts of those circuits are threatened to be broken or deteriorated, so that, in this kind of OA appliances an axial flow fan motor is used for cooling. In particular, in the recent tendency of miniaturization of OA appliances, since the influence by the above heat generation becomes great, a countermeasure against the heat has become an important technical problem. And, on the other hand, the products of OA appliances such as being mass-produced have the demand for low cost from the viewpoint of easy assembly workability.

Next, a conventional axial flow fan motor is explained based on FIG. 7, a central projection 2 is provided in a unit with a resin casing 1. Around the outer circumference of this central projection 2, iron cores 3 are fixed, around which stator windings 5 are wound through bobbins 4 made of insulating material. By this iron core 3, the bobbin 4 and the stator winding 5 the stator of the flow fan motor is formed. On the other hand, on an inner circumference of the central projection 2 bearings 6 are coupled with, and on these bearings a shaft 7 is supported. These bearings 6 are fixed by stepped portions 8 and 9 provided on the inner circumference of the central projection 2, a snap ring 10 and a spring 11. On one end of the shaft 7, a yoke 13 is fixed through a zinc casting 12 and on the inner circumference of the yoke 13, a magnet 14 is fixed. With this yoke 13 and the magnet 14, a rotor of the axial flow fan motor is formed. And on the outer circumference of the yoke 13, a resin made impeller 15 is pressed in and fixed, on which wings 16 are mounted.

FIG. 8 shows another conventional axial flow fan motor. What is different from the conventional art shown in FIG. 7 resides in that a bearing box 17 is provided separately from the central projection 2 and adhered to the inner circumference of the central projection 2. And, by a concavo-convex engagement portion 18, the bearing box 17 is prevented from being removed. Further, this bearing box 17 is made of metal in consideration of heat resistance. The other portions of that bearing box 17 are similar with what are shown in FIG. 7, so that, by attaching the similar signs to the similar portions, explanation thereof are omitted.

In the above conventional art, since what is shown in FIG. 7, the central projection 2 is provided in a unitary manner in the resin made casing 1 and adapted to couple the bearings 6 with the projection 2 to support the shaft 7, the number of parts is reduced which is advantageous in assembling and invites a low cost, however, there is another problem such as mentioned below. That is, the stator consisting of the iron core 3 and the stator winding 5 may generate heat due to the copper wearing and the iron wearing. And, the iron core 3 is mounted on the outer circumference of the central projection 2 directly, so that due to the heat generated the central portion is threatened to be deformed and accelerated in its deterioration.

Further, by the heat too generated from the electronic parts accommodated in OA appliances the central projection is threatened to be deformed and accelerated to be deteriorated. Thus, when the central projection is deformed, the shaft center of the rotor formed with the yoke 13 and the magnet 14 is made to be displaced to cause the function of the axial flow fan motor to be deteriorated, and that, due to the deterioration of the central projection, a use life of the axial flow fan motor becomes short, by which the use life of OA appliance as a whole is threatened to become short.

Next, in the conventional art shown in FIG. 8, since the bearing box 17 is made of a metal, there are following defects to be improved. That is, although, since the bearing box itself is made of a metal, there is no trouble against heat, due to the great thermal conductivity, the central projection 2 is heated indirectly. Accordingly, as well as in FIG. 7 which shows the conventional art, the central projection is deformed by the heat and accelerated in being deteriorated, and as a result the function of the axial flow fan motor and the use life thereof too are threatened to become short. In addition, in order to solve the problem it is recommended to make the casing 1, which is formed in a unitary manner with the central projection 2, with a resin having a heat resistance, however, at that time, a high priced resin has to be used in a great amount for that, so that the axial flow fan motor has to become high-priced.

Further, when the metal made bearing box 17 is inserted in the central projection 2 made of a resin, since the coefficient of thermal expansion is different between a resin and a metal with each other, there happens a case where the coupling is loosened due to the heat to be generated between different materials to be coupled. In the case, where a loosening is thus generated, since the shaft center of the rotor to the stator is resulted in being displaced, the function of the axial flow fan motor is deteriorated and a vibration is generated, which is not preferable for the OA appliance.

Still further, since the bearing box 17 and the central projection 2 are fixed by gluing, there need a application process of a glue and a drying process thereof, which invites a difficulty of an automatic assembly to cause a decrease of productivity. In addition, since the assembly of the stator and the rotor can not be carried-out before the bearing box 17 is fixed on the central projection 2 by solidification of the glue, which causes to waste time and is not preferable from the viewpoint of assembling workability and productivity. Accordingly, one object of the present invention is to provide an axial flow fan motor, in which, in order to solve the above problems, the thermal deformation and deterioration of the bearing box are reduced to maintain the function of the axial flow fan motor, prolong the use life, reduce the use amount of a high priced resin to decrease the cost and increase the assembling workability avoiding the use of glue to increase the productivity.

SUMMARY OF THE INVENTION

According to the first aspect of the present invention, in an axial flow fan motor in which, on the inner circumference of a bearing box provided in a motor housing in a unitary manner bearings are coupled to support a shaft and on the outer circumference of the bearing box a stator is fixed, said motor housing is provided with a central projection to be coupled with the bearing box, stepped portions are formed on the bearing box and the central projection for preventing the bearing box from removing in an axial direction, and the bearing box is made of a resin having heat resistance.

According to the second aspect of the present invention, said stepped portions are formed in such a combination of a wedge-like projection and a groove to be engaged with said wedge-like projection.

According to the third aspect of the present invention, the side to be inserted in the central projection of the bearing box is provided with a slit and the outer diameter portion of the bearing box is adapted to be deformed elastically in the diametrical direction of the bearing box.

According to the fourth aspect of the present invention, on the outer circumference of the bearing box stepped portions for preventing the stator from being removed are formed and adapted to be positioned in a plane including the center of the bearing box between the removal preventing stepped portions.

According to the fifth aspect of the present invention, the bearing box is made of liquid crystal aromatic polyester resin.

According to the sixth aspect of the present invention, the bearing box is made of filler containing PBT resin.

In the first aspect thus constructed, the motor housing and the bearing box are separately formed, the motor housing is provided with the central projection to be coupled with the bearing box and the removal preventing stepped portions are provided on the bearing box and the central projection, thereby without using a glue the bearing box can be fixed on the central projection. And, the bearing box is separated and made of a resin having a heat resistance. Thereby, the use amount of a high-priced resin is reduced and the thermal deformation and deterioration are lessened.

In the second aspect of the present invention, the removal preventing stepped portions are formed wedge-shaped to engage with each other in a combination of a wedge and a groove, so that without a glue the bearing box is secured to be fixed to the central projection.

In the third aspect of the present invention, at the side to be inserted in the central projection of the bearing box a plurality of slits in an axial direction are provided to enable the outer diameter portion of the bearing box to be deformed elastically in a radial direction to ease the assembly of the bearing box to the central projection for securing to couple the bearing box to the central projection due to the elastic force.

In the fourth aspect of the present invention, since the stepped portions for preventing the stator from being removed are provided in a plane including the center of the bearing box between removal preventing portions, an undercut portion to be needed at the time of molding of the bearing box is managed without it to simplify the shape of the mold therefor.

In the fifth aspect of the present invention, the bearing box is formed with a liquid crystal aromatic polyester resin to lessen a thermal deformation and deterioration.

In the sixth aspect of the present invention, the bearing box is formed with a filler containing PBT resin to lessen a thermal deformation and deterioration.

EMBODIMENT

Figure 6:
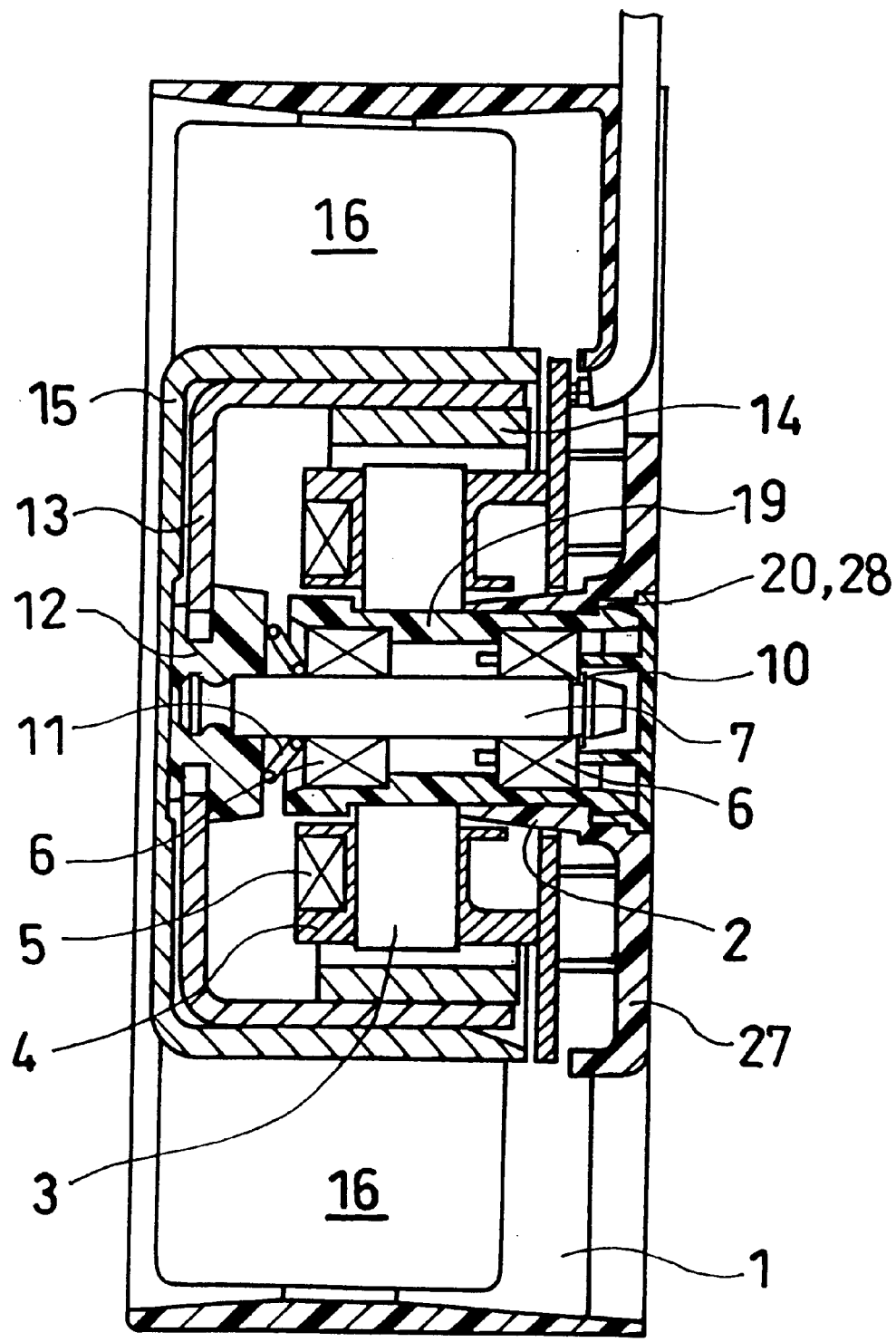
FIG. 6 is a vertically sectional view of an axial flow fan motor of the present invention.
Figure 7:
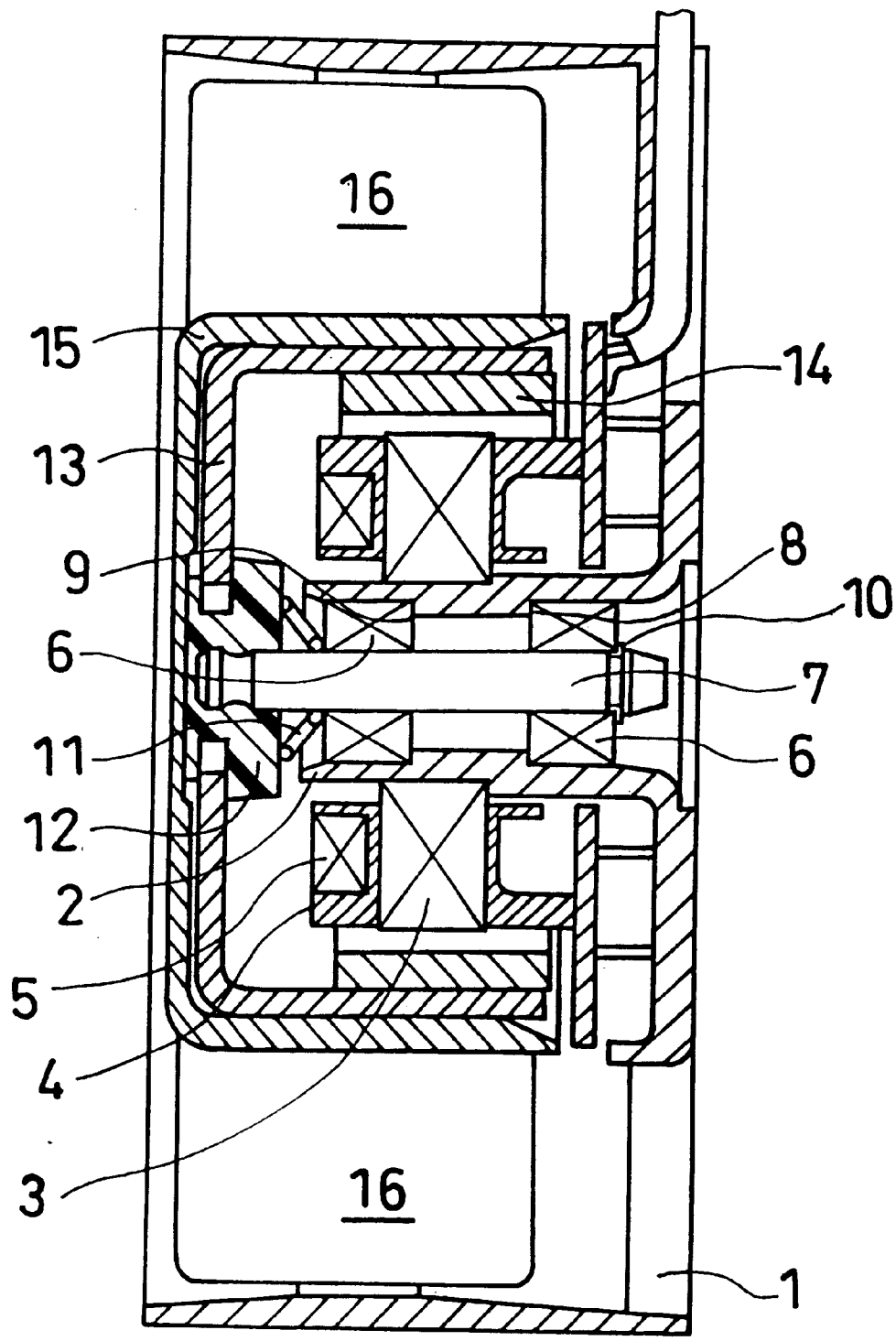
FIG. 7 is a vertically sectional view of a conventional axial flow fan motor.
Figure 8:
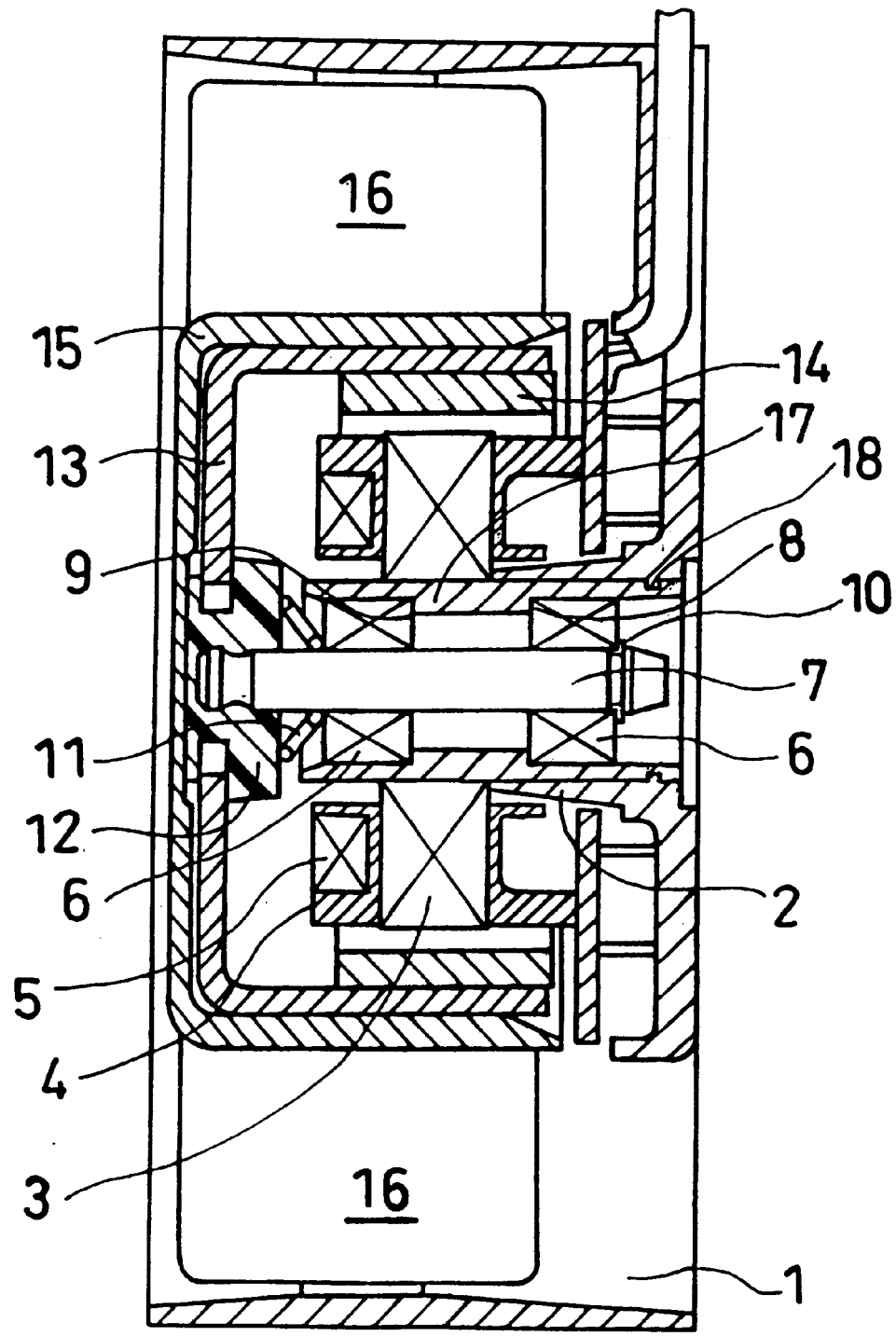
FIG. 8 is a vertically sectional view of a conventional axial flow fan motor different from what is shown in FIG. 7.

Hereinafter, an embodiment of the present invention is explained. First, referring to FIG. 6, an outline of an axial flow fan motor will be explained. In FIG. 6, on a casing 1 made of a resin a central projection 2 is formed in a unitary manner. On an outer circumference of the projection 2, an iron core 3 is fixed, around which a stator winding 5 is wound through an insulation bobbin 4. With these iron core 3, bobbin 4 and stator winding 5 a stator of an axial flow fan motor is formed. And, on the inner circumference of the central projection 2 bearings 6 are coupled, on which a shaft 7 is pivoted. The bearings 6 are fixed by stepped portions, with a snap ring 10 and a spring 11. On one end of the shaft 7 a yoke 13 is fixed through a zinc casting 12, and on the inner circumference of which magnets 14 are fixed. With this yoke 13 and the magnets 14 a rotor of the axial flow fan motor is formed. And, on the outer circumference of the yoke 13, resin made impellers 15 are pressed in and fixed, on which wings 16 are mounted. Further, a bearing box 19 is provided separately from the central projection 2 and coupled on the inner circumference of the central projection 2.

Figure 1:
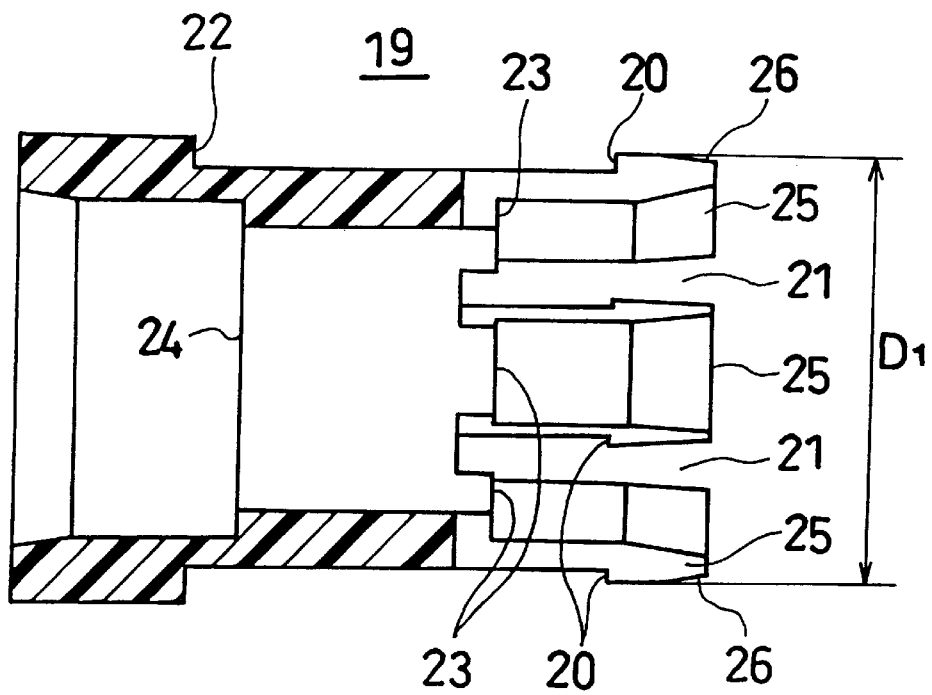
FIG. 1 is a vertically sectional view of one embodiment of the present invention.

FIG. 1 shows the bearing box 19 in FIG. 6 in section. On the end portion of the bearing box 19, which is inserted in the central projection 2, removal preventing stepped portions 20 are formed. And, the end portion on which the stepped portion 20 is provided is provided with slits 21 which divide the end portion of the bearing box 19 into plurality of divided walls 25, thereby this end portion of the bearing box 19 is able to be deformed elastically in the radial direction. And, on the tip end of this divided wall 25 a tapered surface 26 is formed. Further, on the inner surface of this divided wall 25 being deformable elastically, bearing stepped portion 23 is provided for being engaged with an outer ring of the bearing 6. On the other hand, on the outer circumference of the other end portion of the bearing box 19 stepped portion 22 for the stator is provided and on the inner surface thereof bearing stepped portion 24 are provided for being engaged with one outer ring of the bearing 6.

Figure 2:
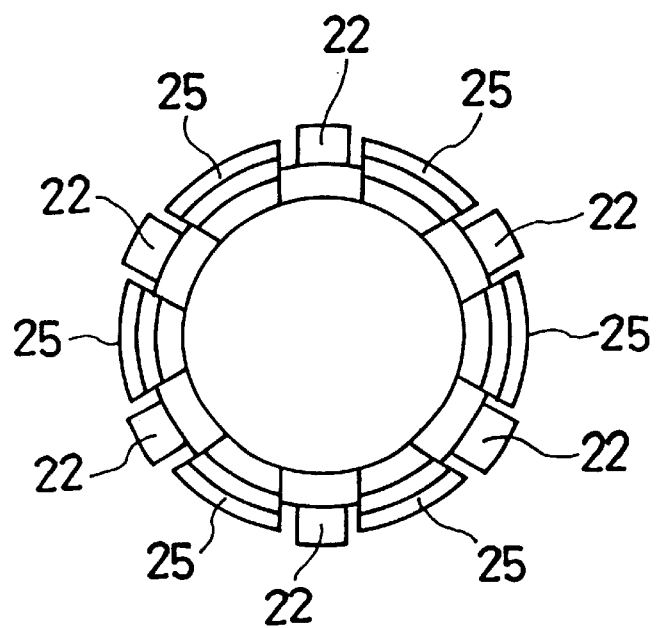
FIG. 2 is a right side view of FIG. 1.

FIG. 2 shows the right side of FIG. 1, in a plane including the center of the bearing box 19, the stepped portions 22 are adapted to be disposed between the divided walls 25.

Figure 3:
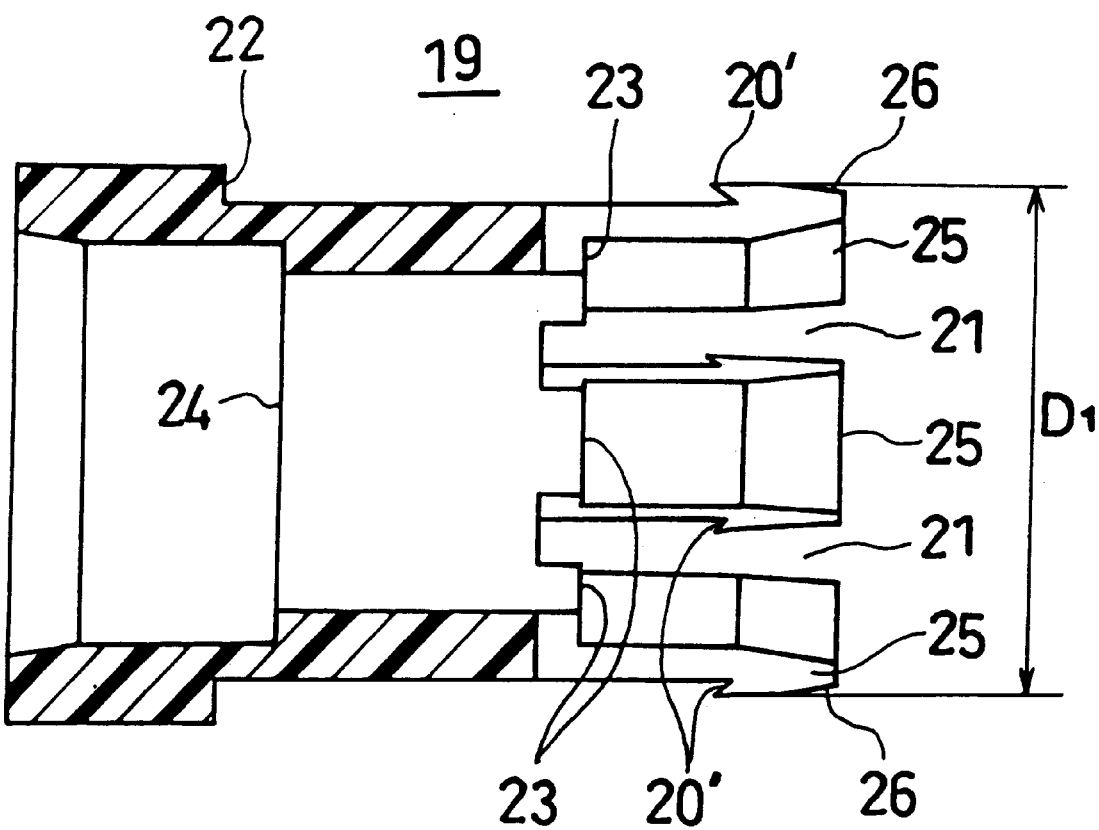
FIG. 3 is a vertically sectional view of another embodiment of the bearing box different from what is shown in FIG. 1.

FIG. 3 shows another embodiment of the bearing box 19, and what is different from the bearing box 19 shown in FIG. 1 resides in that, in place of the stepped portion 20 in FIG. 1, a wedge-like stepped portion 20' is provided in FIG. 3. The other portions are identical with each other, so that the identical members are shown in identical signs and the explanations thereof are omitted. The bearing box 19 shown in FIGS. 1 and 2 are made of such resin as having heat resistance, oil resistance and stability against deformation, for example, liquid crystal aromatic polyester resin (trade name: Sumitomo Chemical LCP resin) or filler containing PBT resin (filler containing polybutyle phthalate resin).

Figure 4:
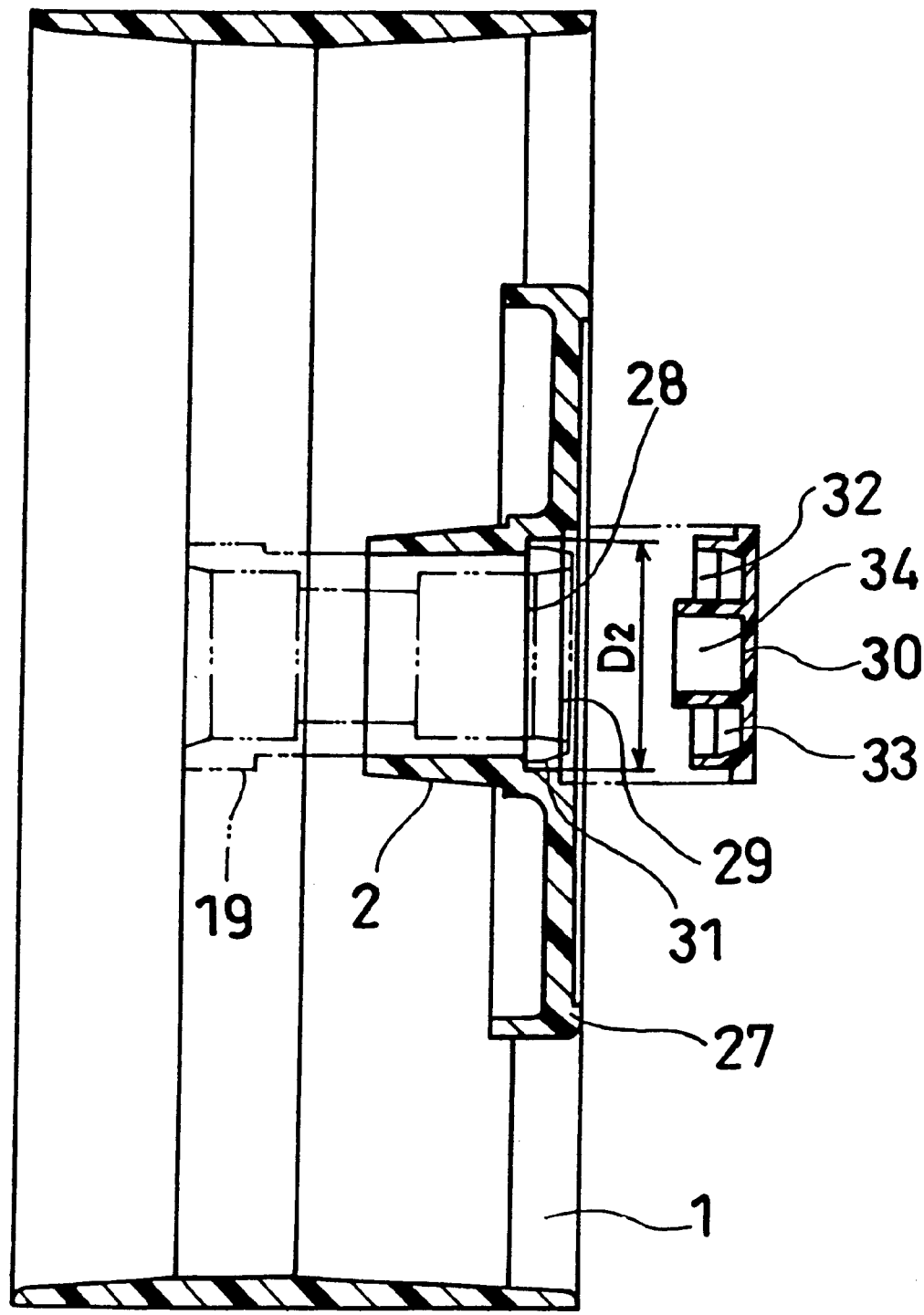
FIG. 4 is a vertically sectional view of one embodiment of a casing of the present invention.

FIG. 4 shows the casing 1 in FIG. 6. The central projection 2 and a motor housing 27 are molded in a unitary manner. On the motor housing 27, a removal preventing stepped portion 28 is formed and the removal preventing portion 20 provided on the bearing box 19 is adapted to be engaged with it in such a state as the bearing box 19 is coupled with the central projection 2. Further, the inner diameter $D_2$ of the stepped portion 28 is larger than the outer diameter $D_1$ (FIG. 1), and in the state where the bearing box 19 is coupled with the central projection 2, between the inner circumference of the removal preventing stepped portion 28 and the outer circumference of the divided wall 25, a gap 31 is adapted to be formed.

And, an insert portion 32 of a fixations member 30 is inserted into this gap 31 while the tapered surface 26 of the tip end of the divided wall 25 of the bearing box 19 being pressed against a tapered face 33 of the fixation member 30. Thus, by this insertion of the fixation member 30 by pressure, due to the synergistic effect of the elastic force of the divided wall 25 and the pressure-in force of the fixation member 30, the center of the central projection 2 and the center of the bearing box 19 can be accorded, and further the removal preventing stepped portion 28 and the fixation member 30 prevent the bearing box 19 from being displaced toward the center of the bearing box 19, and bearing stepped portion 23 and the inner ring supporting portion 34 fix the bearing 6. And, since the bearing 6 is coupled with the inner circumference of the divided wall 25 after the bearing box 19 is inserted in the central projection 2, when the bearing box 19 is inserted in the central projection 2, due to the elasticity of the divided wall 25, the insertion of the bearing box 19 becomes easier, and after the bearing 6 is coupled with the inner circumference of the divided wall 25, the length of the divided wall 25 becomes substantially short, thereby the elastic force of the divided wall 25 is reinforced. Thus, due to the synergistic effect of the elastic force of the divided wall 25 and the press-in of the fixation member 30, the center positioning and fixation of the bearing box 19 and the fixation of the bearing 6 are carried out resulting in a precise assembling and an increasing workability in assembling. Further, 29 designates a stepped portion for inserting of the fixation member 30.

Figure 5:
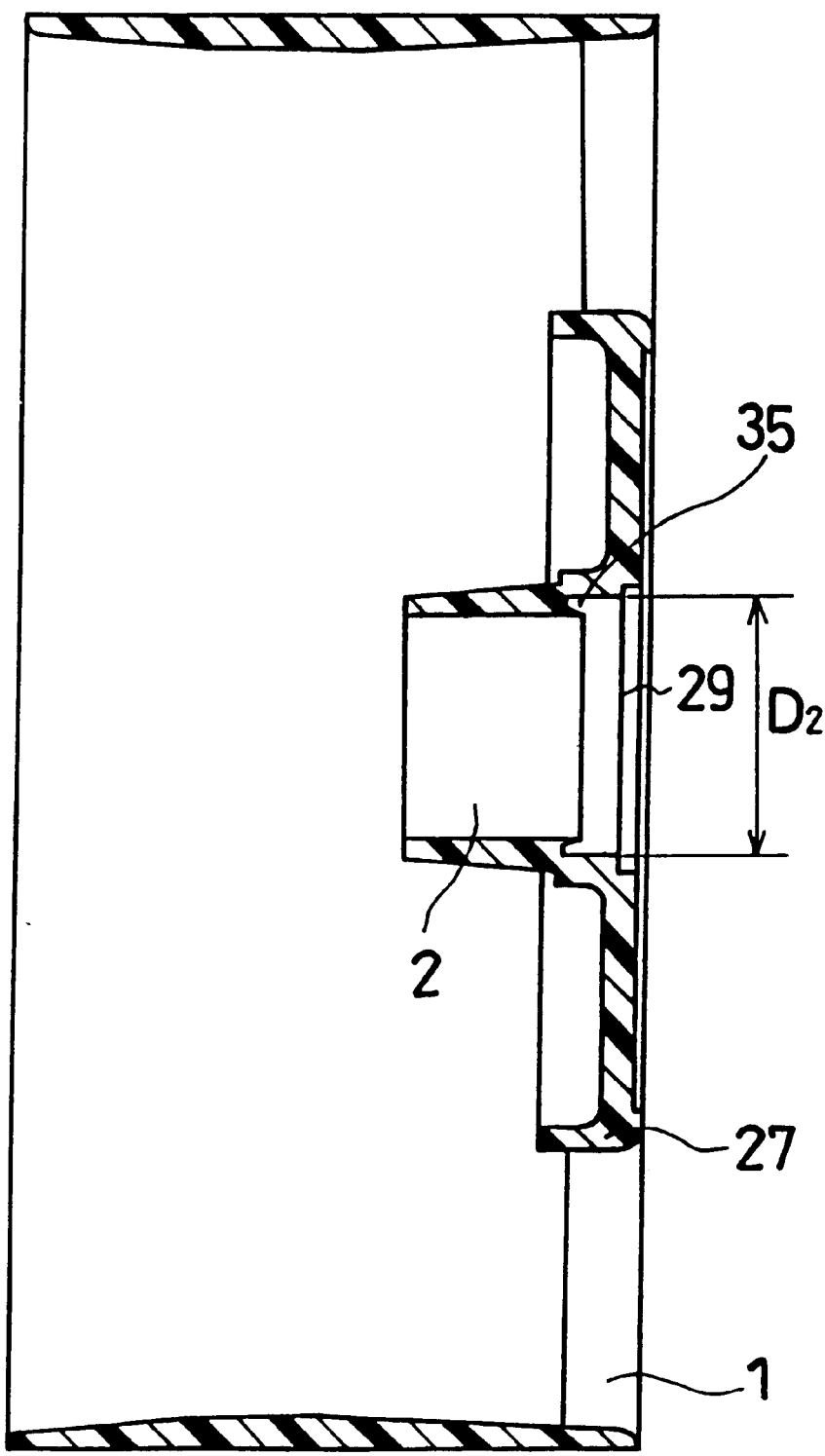
FIG. 5 is a vertically sectional view of another embodiment of a casing of the present invention.

FIG. 5 shows a casing corresponding to the bearing box 19 shown in FIG. 3. That is, the motor housing 27 is provided with a wedge-like groove 35 with which a wedge-like stepped portion 20' is engaged. Accordingly, the wedge-like stepped portion 20' is engaged tightly with the wedge-like groove 35. As to the other portions, since those are identical with what are shown previously, the identical portions are shown with the same signs and the explanations thereof are omitted. And, the casing 1 shown in FIGS. 4 and 5 is made of a low-priced ABS (acrylonitrile butadiene-styrene resin).

Hereinafter, an assembly process of the shaft portion of thus constituted axial flow fan motor of the present invention is explained. In FIG. 6, the assembly of the bearing box 19 is carried out, first, following processes in which the bearing box 19 is inserted in the central projection 2 until the removal preventing stepped portion 20 (FIG. 1) engages with the removal preventing stepped portion 28 (FIG. 4), and subsequently, the bearing 6 is coupled with the bearing box 19.

As described above, since the motor housing 27 and the bearing box 19 are separated, the central projection 2 is provided on the motor housing 27 for coupling the bearing box 19 and, as shown in FIG. 1, the removal preventing stepped portion 20 is provided on the bearing box 19 and, as shown in FIG. 4, the removal preventing stepped portion 28 is formed on the central projection 2 (motor housing 27), the bearing box 19 can be fixed on the central projection 2 without using any glue. Further, by fixing it with the fixation member 30 (FIG. 4), the centering of the bearing box 19, the preventing of the axial displacement and the fixing of the bearing 6 can be carried out simultaneously, an assembly precision and an assembly workability are increased. And, since the bearing box 19 is separated and made of a resin having heat resistance and a heat deterioration are lessened. And further, since the central projection 2 is also made of resin, coupling between similar materials can be available.

Further, as shown in FIGS. 3 and 5, in the case where the wedge-like removal preventing stepped portion 20' is provided on the bearing box 19, the wedge-like groove 35 is provided on the central projection 2 and those are engaged mutually in a wedge-like combination manner, the bearing box 19 can be fixed on the central projection 2 more securely.

And, as shown in FIGS. 1 and 3, on the bearing box 19 inserting side of the central projection the slits 21 are provided, which enable the outer diameter portion of the bearing box 19 to be bent elastically in the radial direction, thereby, the assembling of the bearing box 19 to the central projection 2 is made easier and more securely the bearing box 19 is assembled due to the elasticity to the central projection 2. Further, by using the fixation member 30, the centering of the bearing box 19, the prevention of the axial displacement of the bearing box 19 and the fixing of the bearing 6 can be carried out simultaneously, which causes the assembly precision and workability to be increased.

Further, as shown in FIG. 1, on the outer circumference of the bearing box 19, a stator removal preventing stepped portion 22 is formed. Since this stator removal preventing stepped portion 22 is provided between the removal preventing stepped portions 20 (divided wall 25) viewing it in a plane crossing the center axis of the bearing box 19, which may omit an undercut portion when preparing the mold the bearing box 19 to simplify the mold making.

And, by making the bearing box 19 with the liquid crystal aromatic polyester resin or the filler containing PBT resin, the thermal deformation and deterioration of the bearing box 19 can be lessened.

In the first aspect of the present invention, by separating the motor housing and the bearing box, providing the central projection on the motor housing for coupling the bearing box and forming the removal stepped portions on both of the bearing box and the central projection for preventing the bearing box which is coupled with the central projection from being removed axially, the bearing box 19 is fixed on the central projection without using any glue, thereby the assembly workability and the productivity are increased.

And, further, by molding the bearing box with a resin having a heat resistance separately, and since a high priced resin can be used in a lessened amount and the similar materials are adapted to be used, the thermal deformation and deterioration of the bearing box become lessened while maintaining the function of the axial flow fan motor and making its life long, thereby the use amount of the high priced resin is lessened and the price becomes lowered.

Next, in the second aspect of the present invention, the removal preventing stepped portions are formed as a combination of a wedge-like stepped portion and a wedge-like groove which are engaged with each other, and without using any glue, the bearing box is adapted to be fixed securely to the central projection, so that the assembly workability and the productivity are increased.

In the third aspect of the present invention, by providing slits on the side of the bearing box which is inserted in the central projection, the outer diameter of the bearing box is adapted to be deformed elastically to make assembly of the bearing box easier and the coupling of the bearing box with the central projection secure due to the elastic force.

In the fourth aspect of the present invention, since the stepped portion for preventing the stator from being removed is formed on the outer circumference of the bearing box, in a plane including a center of the bearing box the stepped portion for preventing the stator from being removed is adapted to be positioned between the removal preventing stepped portions and make the undercut at the time of molding of the bearing box unnecessary to simplify the configuration of the mold, the cost of the mold becomes lowered to make the axial flow fan motor low-priced.

In the fifth and sixth aspects of the present invention, the bearing box is made of the liquid crystal aromatic polyester resin or the filler containing PBT resin to lessen the thermal deformation and deterioration, the function of the axial flow fan motor is maintained and the life can be prolonged.

What is claimed is:

1. In an axial flow fan motor in which, on the inner circumference of a bearing box provided in a motor housing in a unitary manner bearings are coupled to support a shaft and on the outer circumference of the bearing box a stator is fixed, the axial flow fan motor is characterized in that said motor housing is provided with a central projection into which an axial end of the bearing box is inserted, stepped portions are formed on the bearing box and the central projection for preventing the bearing box from being removed in an axial direction, the axial end of the bearing box to be inserted in the central projection is provided with slits and the outer circumference of the bearing box is adapted to be deformed elastically in the radial direction of the bearing box so that a snap coupling is formed between the bearing box and the central projection of the motor housing, a fixation member is press-fitted in the central projection and holds one of the bearings, and the bearing box is made of a resin having heat resistance.

2. An axial flow fan motor according to claim 1, in which the bearing box is made of liquid crystal aromatic polyester resin.

3. An axial flow fan motor according to claim 1, in which the bearing box is made of a filler containing PBT resin.

4. An axial flow fan motor according to claim 1, in which on the outer circumference of the bearing box stepped portions for preventing the stator from being removed are formed and adapted to be positioned in a plane including the center of the bearing box between the removal preventing stepped portions.

5. An axial flow fan motor according to claim 1, in which the bearing box is made of liquid crystal aromatic polyester resin.

6. An axial flow fan motor according to claim 1, in which the bearing box is made of a filler containing PBT resin.

7. An axial flow fan motor according to claim 1, in which on the outer circumference of the bearing box stepped portions for preventing the stator from being removed are formed and adapted to be positioned in a plane including the center of the bearing box between the removal preventing stepped portions.

8. An axial flow fan motor according to claim 7, in which the bearing box is made of liquid crystal aromatic polyester resin.

9. An axial flow fan motor according to claim 7, in which the bearing box is made of a filler containing PBT resin.

10. An axial flow fan motor according to claim 1, in which said stepped portions are in the form of a wedge-like projection and a wedge-like groove, which are engaged with each other.

11. An axial flow fan motor according to claim 10, in which on the outer circumference of the bearing box stepped portions for preventing the stator from being removed are formed and adapted to be positioned in a plane including the center of the bearing box between the removal preventing stepped portions.

12. An axial flow fan motor according to claim 10, in which the bearing box is made of liquid crystal aromatic polyester resin.

13. An axial flow fan motor according to claim 10, in which the bearing box is made of a filler containing PBT resin.

14. An axial flow fan motor, comprising:

a shaft;

a motor housing having a unitary central projection that defines at least one stepped portion;

a bearing box provided in the motor housing, the bearing box having an inner circumference, an outer circumference and an axial end, the axial end of the bearing box being inserted into the central projection of the motor housing, the bearing box defining at least one stepped portion that communicates with the at least one stepped portion of the central projection of the motor housing to prevent the bearing box from being removed in an axial direction, the axial end of the bearing box defining slits, the outer circumference of the bearing box being elastically deformable in a radial direction to form a snap coupling between the bearing box and the central projection of the motor housing, the bearing box being made of a resin having heat resistance;

at least one bearing coupled to the inner circumference of the bearing box to support the shaft;

a stator fixed to the outer circumference of the bearing box; and a fixation member press-fitted in the central projection of the motor housing, the fixation member holding the at least one bearing.

* * * * *